(12) United States Patent
Junkins

(10) Patent No.: US 9,468,343 B2
(45) Date of Patent: Oct. 18, 2016

(54) VIBRATORY BODY SCRUBBER

(71) Applicant: Mitch Junkins, Newport Beach, CA (US)

(72) Inventor: Mitch Junkins, Newport Beach, CA (US)

(*) Notice: Subject to any disclaimer, the term of this patent is extended or adjusted under 35 U.S.C. 154(b) by 197 days.

(21) Appl. No.: 13/773,391

(22) Filed: Feb. 21, 2013

(65) Prior Publication Data

US 2013/0227802 A1    Sep. 5, 2013

Related U.S. Application Data

(60) Provisional application No. 61/601,455, filed on Feb. 21, 2012.

(51) Int. Cl.
| | | |
|---|---|---|
| *A47K 7/04* | (2006.01) | |
| *A61H 7/00* | (2006.01) | |
| *A61H 23/02* | (2006.01) | |
| *B08B 1/00* | (2006.01) | |
| *B08B 7/02* | (2006.01) | |

(52) U.S. Cl.
CPC ............. *A47K 7/04* (2013.01); *A47K 7/043* (2013.01); *A61H 7/005* (2013.01); *A61H 23/02* (2013.01); *B08B 1/00* (2013.01); *B08B 1/001* (2013.01); *B08B 7/02* (2013.01)

(58) Field of Classification Search
CPC ........ A47K 7/04; A47K 7/043; A61H 7/003; A61H 7/004; A61H 23/00; A61H 23/06; A61H 7/005; A61H 23/02; A46B 13/023

USPC .................................................. 15/22.1, 97.1
See application file for complete search history.

(56) References Cited

U.S. PATENT DOCUMENTS

| | | | | |
|---|---|---|---|---|
| 2,156,839 | A * | 5/1939 | Buffalow | A61H 15/0092 601/128 |
| 5,206,967 | A * | 5/1993 | Fushiya et al. | 15/97.1 |
| 6,039,491 | A * | 3/2000 | Badillo | A47K 7/03 401/183 |
| 2009/0188528 | A1* | 7/2009 | Junkins | 134/6 |
| 2010/0269842 | A1* | 10/2010 | Gueret | 132/200 |
| 2011/0084097 | A1* | 4/2011 | Gueret | 222/196 |
| 2011/0088713 | A1* | 4/2011 | Luo | 132/218 |

* cited by examiner

*Primary Examiner* — Randall Chin
(74) *Attorney, Agent, or Firm* — Rutan & Tucker LLP; Hani Z. Sayed

(57) ABSTRACT

An improved apparatus and method for cleaning is provided. More specifically, the present invention provides an improved apparatus having a vibratory portion adapted to a traditional scrubber apparatus such as a body scrubber. Additionally, the present invention provides an improved apparatus and method wherein the apparatus may have at least a vibratory portion adapted to fit about the body scrubber which may be activated and/or de-activated by the user. Moreover, the apparatus may include a reservoir for storage of a cleansing agent that may be dispensed from the vibratory portion to the body scrubber portion to help facilitate cleansing of the portion of the body to be cleaned. Still further, the invention may include at least a handle assembly in combination with the vibratory portion to provide a handle for use by the individual user.

2 Claims, 3 Drawing Sheets

FIG. 1A
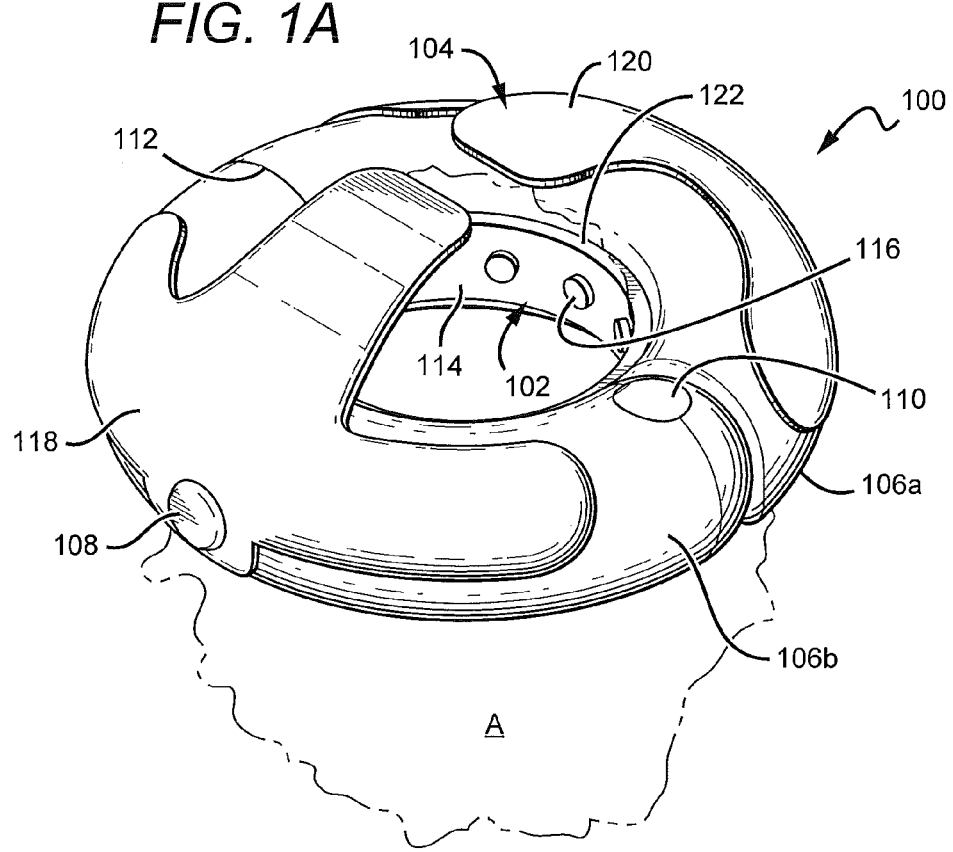
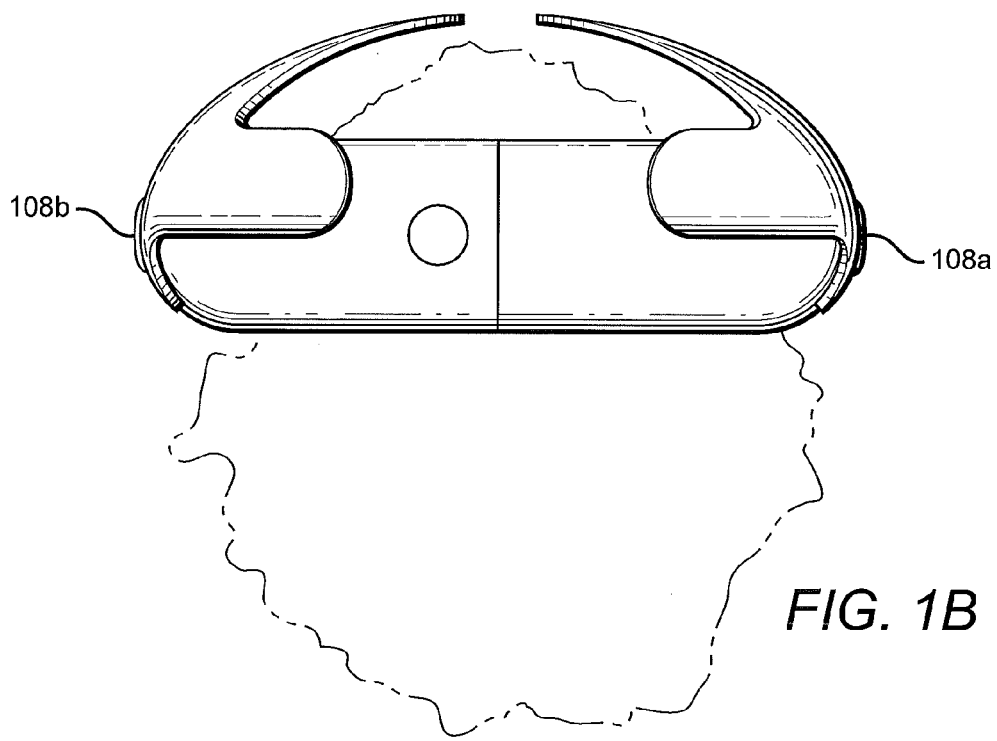
FIG. 1B

US 9,468,343 B2

VIBRATORY BODY SCRUBBER

CROSS REFERENCE TO RELATED APPLICATION

This application claims priority to earlier filed U.S. Provisional Application No. 61/601,455 filed on Feb. 21, 2012.

FIELD OF THE INVENTION

The field of the invention is for scrubbers. More specifically, the field of invention is for a vibratory or sonic body scrubber having at least a handle mechanism for body cleaning.

BACKGROUND

The history of bathing is as early as time itself. The natural odor and dirt accumulated by an individual that has not bathed is pretty evident to individuals in close proximity. Throughout history, civilization has had different ways of taking and utilizing bathing techniques. For instance, the Romans were famous for their baths. The Romans were known for frequenting inexpensive public baths. These baths may have had attendants, lounges and other amenities.

However, just bathing whether in running or other forms of water does not always accomplish the goal of cleaning the body. For example, if an individual were to spray his/her car down with water, the act of eliminating dirt form the vehicle would not be accomplished. In fact, the vehicle would likely be as dirty after the application of water as it was before it was sprayed. In order to effectuate adequate cleaning of any article, a cleaning agent is typically used in conjunction with some sort of agitation.

Washing is typically done by the use of a liquid, a cleaning agent and a cleaning apparatus. It is usually an essential part of good hygiene and health. Frequently, a soap and/or detergent may be used to assist in the emulsification of dirt particles and other contaminants that may have collected on a body.

The use of a bath scrubber has been known for some time. The typical bath scrubber has a hand held portion and an abrasive portion. The bath scrubber may be held by a user and the abrasive portion is fitted against the surface of the body to be washed whereby the abrasive portion may agitate the contaminants and/or dirt particles which thereby releases the contaminants and/or dirt particles from the portions of the body to be cleansed. Other types of scrubbers eliminate the hand held portions and are commonly referred to as scrubbies. Scrubbies are essentially a ball of semi-abrasive material similar to a sponge where the scrubby may retain some emulsification agent such as soap and the like and be used by the individual to clean the body of contaminants.

However, these scrubbies or hand held scrubbers generally require extensive user interaction and may not adequately release dirt particles and contaminants from the body. Additionally, the bath scrubber must be used with sufficient force to dislodge the contaminants and dirty particles from the body. Often, the user does not use adequate force or is unable to do so.

Additionally, these scrubbers still require a cleaning agent to be applied either separately to the body or directly to the scrubber. No invention exists for a scrubber that may have a self contained cleaning agent enclosed therein and released upon request by the user.

According to embodiments as described herein, an improved apparatus for cleansing is provided wherein the improved apparatus may be automated and require less physical force by the user to operate.

SUMMARY OF THE INVENTION

The present invention provides an improved apparatus and method for cleaning. More specifically, the present invention provides an improved apparatus having a sonic portion adapted to a traditional scrubber apparatus such as a body scrubber. Additionally, the present invention provides an improved apparatus and method wherein the apparatus may have at least a sonic portion adapted to fit about the body scrubber which may be actuated or de-activated by the user. Moreover, the apparatus may include a reservoir for storage of a cleansing agent that may be dispensed from the sonic portion to the body scrubber portion to help facilitate cleansing of the portion of the body to be cleaned. Still further, the invention may include at least a handle assembly in combination with the sonic portion to provide a handle for use by the individual user.

To this end, in an exemplary embodiment of the present invention, an apparatus for cleaning an object is provided. The apparatus may have a handle portion and a sonic adaptor detachably connected to at least a scrubber apparatus. Additionally, the apparatus has a scrubber portion attached to the sonic adaptor and at least a power source.

To this end, in a exemplary embodiment of the present invention, an apparatus for cleaning an object, the apparatus comprising: a handle portion; said handle portion connected to a vibratory portion; a scrubber assembly whereby the vibratory portion is removably attached to the scrubber assembly; and a motor to drive the vibratory portion.

In another exemplary embodiment, wherein said vibratory portion may have a reservoir contained therein wherein the reservoir is configured to contain a cleansing agent.

In another exemplary embodiment, wherein said cleaning apparatus has an on/off switch whereby the on/off switch activates and deactivates the motor.

In another exemplary embodiment, wherein the cleaning apparatus may have a vibratory portion having a male and female portion which may be attached to one another while in use and may be disconnected from the scrubber assembly and placed on another scrubber apparatus as desired by the individual user.

In another exemplary embodiment, wherein the vibratory portion comprises a first portion and a second portion hinged together.

In another exemplary embodiment, wherein the vibratory portion comprises a generally circular body configured to circumscribe the scrubber assembly.

In another exemplary embodiment, wherein the vibratory portion is attached to the scrubber assembly by a sleeve.

In another exemplary embodiment, wherein the vibratory portion comprises two body portions hinged at one end and removably coupled at a second end.

In another exemplary embodiment, wherein the vibratory portion comprises at least two body portions, wherein at least one body portion is elastic.

In another exemplary embodiment, wherein the vibratory portion comprises at least four body portions, wherein at least two body portions are relatively flexible and separate at least two relatively harder body portions.

In another exemplary embodiment, wherein the vibratory portion comprises an elastic ring.

In another exemplary embodiment, further comprises a reservoir configured to dispense a cleaning agent onto the attached scrubber assembly.

In another exemplary embodiment, further comprises a retention feature between the vibratory portion and the attached scrubber assembly.

In another exemplary embodiment, wherein the retention feature is a gripping surface comprising projections from the vibratory portion toward the scrubber assembly.

In another exemplary embodiment, wherein a cleaning fluid is dispensed to the scrubber assembly through the retention feature.

In another exemplary embodiment, wherein the handle comprises two surfaces on opposite sides of the vibratory portion directed toward each other and away from the vibratory portion.

In another exemplary embodiment, wherein the surfaces are generally tapered, arched, planar surfaces.

In another exemplary embodiment, wherein the cleaning apparatus may be utilized to clean a human body, animal body, inanimate objects including homes, cars, boats, plastic, wood, or metal.

In another exemplary embodiment, the apparatus has a body scrubber whereby the body scrubber is attached to a sonic adaptor.

In another exemplary embodiment, the apparatus has a motor that is powered by a power source.

In another exemplary embodiment, the apparatus has a motor that is powered by a power source wherein the power source is a battery.

In another exemplary embodiment, the apparatus has a handle portion that may have a reservoir contained therein wherein the reservoir may contain a cleansing agent.

In another exemplary embodiment, the apparatus has an on/off switch whereby the on/off switch activates and deactivates the motor.

In another exemplary embodiment, the apparatus has a sonic portion adapted to fit about the body scrubber in a removably detachable fashion such that the sonic portion may be adapted to fit about any of a plurality of body scrubber devices.

In another exemplary embodiment, the apparatus has a sonic portion brush that may be removably attached to the body scrubber apparatus via an attachment portion having at least a male portion and a female portion.

In another exemplary embodiment, the apparatus may be utilized to clean a human body, animal body, inanimate objects including homes, cars, boats, plastic, wood, metal and the like.

In another exemplary embodiment, the apparatus may have a reservoir wherein the reservoir contains a cleansing agent whereby the cleansing agent may be released directly onto the scrubber portion of the apparatus.

In another exemplary embodiment, the apparatus may have a reservoir wherein the reservoir contains a cleansing agent whereby the cleansing agent may be released directly onto the object to be cleaned.

In another exemplary embodiment, the apparatus has a sonic portion adapted to fit about a cleaning object whereby the sonic portion may be utilized and/or de-activated if not desired by the individual user.

In an exemplary embodiment of the present invention, a method for cleaning an object; the method comprising the steps of: providing a scrubber device; incorporating a sonic portion and a handle portion into the scrubber device; and providing a motor to drive the sonic portion.

In an exemplary embodiment, a method for cleaning an object further includes the step of: allowing an individual to activate and deactivate the device.

In an exemplary embodiment, a method for cleaning an object further includes the step of: activating the device whereby the sonic portion vibrates the entirety of the sonic portion and the attached scrubber apparatus.

In an exemplary embodiment, the present invention may be utilized to clean a human body.

In another exemplary embodiment of the present invention, the scrubber may be utilized to cleanse pets, inanimate objects including cars, boats, buildings, toys, dishes and/or any other object that needs cleaning.

In yet another exemplary embodiment of the present invention, the sonic scrubber brush may be operated by a small motor which may provide for power to allow vibration of the entire apparatus.

In still another exemplary embodiment of the present invention, the bi-directional scrubber brush may be operated by a small battery powered motor which may drive the sonic portion of the apparatus.

A further exemplary embodiment of the present invention is a sonic scrubber brush that may be provided wherein the brush may be powered by a power source wherein the power source may be a battery.

In yet another exemplary embodiment, the present invention may include a sonic scrubber brush wherein the brush may have a indicator switch to show power source life left in the device.

Still another exemplary embodiment includes a sonic scrubber brush having a power switch wherein a user may power on the scrubber by toggling the switch, and further wherein the user may power off the device by toggling the switch.

Still another exemplary embodiment of the present invention may include a sonic scrubber brush wherein the sonic portion of the scrubber brush may have a reservoir contained therein wherein the reservoir may have a cleansing agent contained therein for dispersement to the body of an individual or dispersed onto the brush of the scrubber apparatus itself.

Still another exemplary embodiment of the present invention may include a sonic scrubber comprising a sleeve over a ring.

Any of the embodiments of the sonic scrubber may use a vibratory or sonic scrubber to provide a vibratory or sonic action to the scrubber apparatus during use.

Accordingly to embodiments described herein the sonic scrubber may be attached to the scrubber apparatus through a snap fit, elastic fit, hinged mechanism, or other coupling mechanism.

Embodiments of the sonic scrubber as described herein may be used to clean various surfaces such as skin.

Embodiments of the sonic scrubber as described herein may be used with various sleeves or coverings to further retain an attached scrubber apparatus or provide different cleaning interfacing surfaces for the scrubber apparatus.

Various objects, features, aspects and advantages of the present invention will become more apparent from the following detailed description of preferred embodiments of the invention, along with the accompanying drawings in which like numerals represent like components.

BRIEF DESCRIPTION OF THE DRAWING

FIGS. 1A-1C illustrates an exemplary embodiment of a vibratory scrubber attachment according to embodiments as described herein;

DETAILED DESCRIPTION

The following detailed description illustrates by way of example, not by way of limitation, the principles of the invention. This description will clearly enable one skilled in the art to make and use the invention, and describes several embodiments, adaptations, variations, alternatives and uses of the invention, including what is presently believed to be the best mode of carrying out the invention. It should be understood that the drawings are diagrammatic and schematic representations of exemplary embodiments of the invention, and are not limiting of the present invention nor are they necessarily drawn to scale.

Figure 1C:
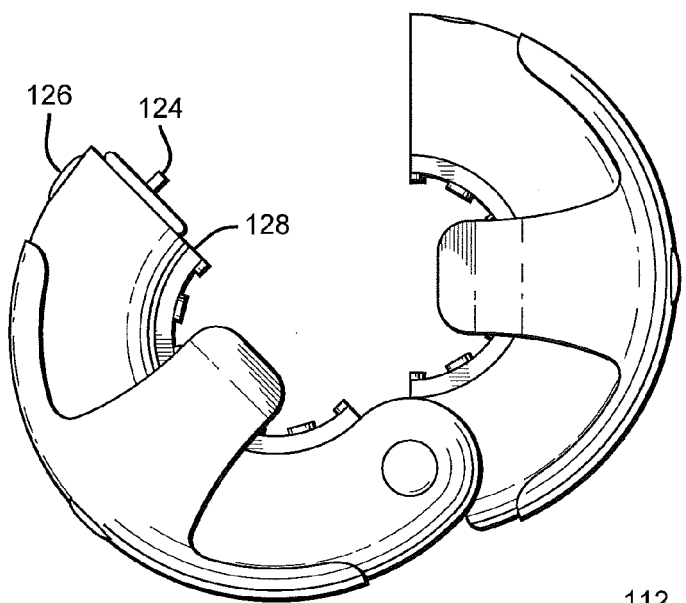

FIGS. 1A-1C illustrates an exemplary embodiment of a vibratory scrubber attachment according to embodiments as described herein. As shown, a body portion 106a, 106b may circumscribe a scrubber assembly A to retain the scrubber assembly within the device 100. The body portions may be contoured or ergonomically shaped to accommodate the scrubbing action. The body portions may comprise other shapes to ease gripping during use. The vibratory scrubber device includes an attachment portion 102 between the body 106a/b and the scrubber assembly A to further retain the scrubber assembly to the device. A radially interior surface of the first and second body portions may include a gripping surface 114. The gripping surface may increase the frictional attachment between the vibratory scrubber device 100 and a coupled scrubber assembly A. The gripping surface may include surface contour features 116 to further engage scrubber assemblies of different size, composition, and configuration. A handle 104 may also be provided to permit a user to adequately hold the scrubber assembly and provide proper pressure during the application process. The handle may be configured to accommodate different hand positions, thus assisting in application to various surfaces. Within the body portion 106a and/or 106b, the vibratory scrubber device 100 may include a mechanism, such as a motor, to vibrate the attached scrubber assembly A.

In an exemplary embodiment, the vibratory scrubber device 100 includes a body portion 106a, 106b. The body portion supports a handle 104 and attachment portion 102. The body portion 106a, 106b, encloses the vibration device, power supply, and necessary electronics. For example, body portion 106a and/or 106b may include a motor, batteries, and supporting electronics to vibrate the vibratory scrubber device 100 and coupled scrubber assembly A. The body portion 106a, 106b may also support a power button 108 to activate the vibration of the device. The power button may be a button, toggle, switch, latch, or other general on/off controller. The body portion may also support in addition to or incorporated into the power button a variable speed control for the vibration of the device. Therefore, the power button may be replaced with a knob to turn the device on and simultaneously set a desired speed for the device. The power and speed control may alternatively be provided by two separate buttons, switches, toggles, etc, such as 108a and 108b. The body portion may also include a power indicator to alert a user of remaining batter battery life for the device. The body portion may also include a connection/connector to recharge the power supply retained within the body.

The body portion may be composed of one or more portions that mate to provide removable attachment to the scrubber assembly A. In an exemplary embodiment, the body portion is composed of two portions 106a and 106b coupled at one side by a hinge 110 and a locking mechanism 112 at the opposing side. The first body portion 106a and second body portion 106b are generally semi-circular or half-circular that when in a closed configuration create a generally complete circular configuration. The body portions may be of other configurations desirable to the application. For example, for easier gripping, the body portions may be generally ovoid or oblong.

A locking mechanism 112 may be used to retain the first portion 106a to the second portion 106b in a closed configuration. The locking mechanism 112 also permits the repeated detachment of the first portion 106a from the second portion 106b for the removal and/or replacement of the same or a different scrubber assemblies. The locking mechanism 112 may include a release, not shown, for the detachment of the first body portion 106a from the second body portion 106b at one side. In an exemplary embodiment, the locking mechanism 112 is a spring latch 124 that is actuated by a push button 126. The spring latch 124 is maintained in an engaged position such that a projection on the latch mates with an indention on the opposing surface of the mating body portion and retains the body portions in a closed configuration. When actuated the push button compresses the spring and moves the latch out of engagement with the indentation on the opposing surface and releases the body portions. Other attachment mechanisms and actuators may be used, such as for example, snap fits, detent, hook and loop, pivot arm latch, and remain within the scope of the invention.

The attachment portion 102 permits non-permanent or removable attachment of the vibratory scrubber device 100 to a scrubber assembly A. In an exemplary embodiment, the attachment portion 102 includes a gripping surface 114 to frictionally engage a scrubber assembly. The gripping surface may circumferentially surround a scrubber assembly when attached thereto. The gripping surface 114 may be, for example, a rubber or other high friction surface on an interior surface of the body portion. The gripping surface is preferably water resistant so that it does not retain water after it has been used. The gripping surface may be coated or otherwise treated to reduce germ proliferation between uses and/or increase engagement to an attached scrubber assembly. The gripping surface 114 may be textured or contain projections or other surface feature to improve the frictional attachment to an attached scrubber assembly A. For example, gripping surface 114 may include knobs 116 projecting inward toward a portion of the scrubber assembly. The projections may be sized and or shaped such that various scrubber assemblies of different size, shape, composition, configuration, and/or orientation may be retained by the same vibratory scrubbing device 100.

A handle 104 may also be coupled to the body portion to assist in gripping and/or applying proper force from the scrubber assembly to the surface to be cleaned. The handle may be ergonomically shaped for ease and comfort of use. The handle may also be oriented to accommodate different hand positions. For example, the handle may include a surface raised from a top surface of the body portion projecting generally inward to accommodate the insertion of four fingers such that the palm is facing toward the body portion and the back of the fingers are positioned against an interior surface of the handle. Therefore, during use, a user would insert one to four fingers of the hand through the handle and generally rub the surface to be cleaned by passing the palm of the hand over the surface, and contacting the attached scrubber assembly to the surface. Such a configuration permits a user to provide downward force to the surface to be cleaned by pressing the palm toward the surface. Alternatively, or in conjunction, the handle may be configured such that the handle is grasped by a closed fist. In this orientation, a user inserts one or more fingers through an opening between the handle and the body portion, and curl the fingers around the handle so that the back side of the fingers are toward the body portion and the inside of the finger grips the handle. A user can therefore impose an additional force on a surface by essentially pushing the closed fist toward the surface to be cleaned.

As shown, an exemplary handle 104 is coupled to the body portion by a flanged region 118. The flanged region fully, substantially (more than 75%), or partially circumscribes the body portion. When the body portion is composed of two sections, the handle may be composed of two portions for each of the respective body portions. The handle 104 then has a projecting surface 120 the projects generally radially inward but away from the body portions, such that a gap is created between the center or interior space of the body portions and the projecting surface of the handle. Two or more projecting surfaces may be used in conjunction with the two or more body portions. As shown, two projecting surfaces 120 are on opposing sides of the respective body portions 106a and 106b, and project radially inward toward each other. the projecting surfaces, are generally arched or dome shaped from the body portion surface to an interior space over the body portions. The width of the projecting surface as seen from above may be generally constant or may taper slightly, with the narrowed section toward the center of the vibratory scrubbing device 100. A gap may be present between the respective projecting surfaces or may be in contact when the body portions are in a closed configuration.

The device may include a reservoir within the vibratory scrubbing device 100 to contain and dispense a cleaning fluid directly to the scrubber assembly or the surface to be cleaned. For example, retaining ring 122 along the interior circumference of the body portion used to enclose and retain the scrubber assembly may include one or more cavities to retain a cleaning substance. Access to the cavities may be achieved when the device is opened through one or more openings 128. The enclosed cleaning material may be dispensed through the one or more surfaces of the retaining ring 122 when a scrubber assembly is attached. For example, knobs 116 may be made of a porous material and/or flexible material that permits the dispersal of the cleaning material when the scrubber assembly is attached and compresses the knob 116. The reservoir may alternatively be included in one or more of the body portions or the handle portions. The reservoir may dispense the enclosed cleaning fluid automatically through use, such as when a sufficient pressure or agitation is applied to the device or by a specific amount at the command of the user. For example, a dispensing button, openings, notch, latch, spray, switch, or other control may be coupled to the reservoir to dispense a desired amount of cleaning fluid upon activation.

Figure 2:
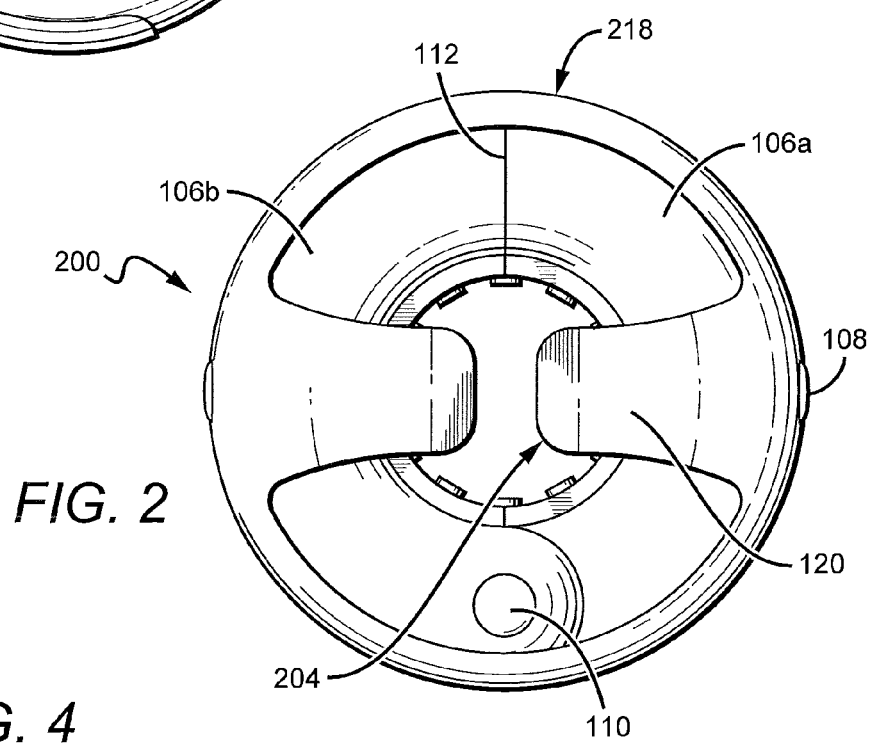
FIG. 2 illustrates an exemplary embodiment of a vibratory scrubber attachment according to embodiments as described herein.

FIG. 2 illustrates an exemplary embodiment of a vibratory scrubber attachment according to embodiments as described herein. The body portion 106a, 106b are similar to those described with respect to FIG. 1 and may circumscribe the scrubber assembly A to retain the scrubber assembly within the device 100. The body portions 106a and 106b may be hinged as described above. However, the locking mechanism may be provided by the handle as described below, such that the locking mechanism 112 may not be present. The handle 204 may be provided to permit a user to adequately hold the scrubber assembly and provide proper pressure during the application process. The handle may be configured to accommodate different hand positions, thus assisting in application to various surfaces. Within the body portion 106a and/or 106b, the vibratory scrubber device 100 may include a mechanism, such as a motor, to vibrate the attached scrubber assembly A.

As show, the handle portion 204 may include projecting surfaces 120 as generally described above to provide a surface to contact a portion of the hand during use. The projecting surfaces 204 may extend from an exterior wall 218 that circumscribes the body portions 106a and 106b. The interior surface of the exterior wall 218 may be contoured to match that of the exterior surface of the body portions 106a and 106b. The exterior wall 218 may then snap or otherwise fit over the body portions to retain the body portions together and thereby enclose and retain the attached scrubber assembly A. The exterior wall 218 may be configured to provide access to the control features of the body portion including power button 108, such as for example through an aperture. The interaction between the control features and aperture may provide an additional coupling mechanism between the handle and the body portions. Either the exterior wall, a portion of the exterior all, the body portion, and/or a portion of one or more of the body portions may be flexible, stretchable, or contractible to permit the easier attachment between the body portion to the handle.

The vibratory scrubbing device 200 may include a motor to vibrate the attached scrubber assembly A. One or more motors may be contained within the body portions 106a and/or 106b and be associated with a power button 108 to turn the device on and off. The power button 108 may be a button, toggle, switch, or other state setting interface to select the power state, and/or level for the device. Incorporated into the power switch or additionally provided as a separate input may be a speed control setting, such that the rate of vibration may be selected by a user. For example, a three position switch may be used for the offsetting, low vibration setting, and high vibration setting. A switch may be included for each motor such that even higher vibrations may be obtained by using the motors in various mode combinations. The body portion may also contain the associated electronics and/or power supply to run the motor. The power may be provided by a replaceable or rechargeable battery. For example, a removable compartment may be incorporated in the body portion so that a replaceable batter may be included. Alternatively, the body portion may be contain rechargeable battery in a sealed configuration to prevent moisture from entering during/after use. The battery may be charged through a connector port or through the surface of the device, such as through magnetic or inductive coupling.

Figure 3:
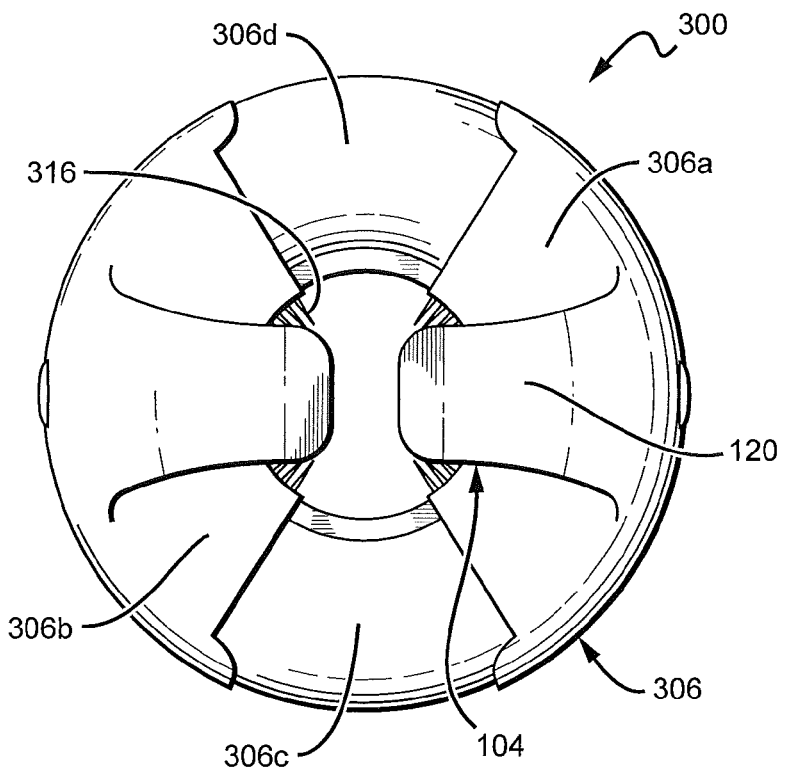
FIG. 3 illustrates an exemplary vibratory scrubbing device according to embodiments described herein.

FIG. 3 illustrates an exemplary vibratory scrubbing device 300 according to embodiments described herein. The vibratory scrubbing device 300 is composed of an integrated body construction. The body 306 is composed of multiple sections including one or more handle sections that may be harder than one or more flexible portions connecting the handle sections. As shown, handle sections 306a and 306b are coupled by flexible sections 306c and 306d. Handle portions are relatively hard body sections roughly a half of the toroid-shaped vibratory scrubbing device 300 composed of two sections of just over a quarter toroid respectively. The handle portions 306a and 306b comprise projecting portions 120 as previously described. The handle portions are relatively hard compared to the connecting flexible portions 306c and 306d. The flexible sections permit the interior space of the vibratory scrubbing device to expand and accommodate and retain an inserted scrubber assembly. For example, flexible sections 306c and 306d may comprise an elastic or rubber material that permits the handle portions 306a and 306b to be separated while maintaining the closed circumference. Interior projections 316 may be included 316 to retain the attached scrubber assembly to the vibratory scrubber device. Interior projections 316 may be flexible fingers that increase the frictional engagement between the device and the scrubber assembly. The interior projections 316 maybe of various lengths to accommodate different sized scrubber assemblies.

Figure 4:
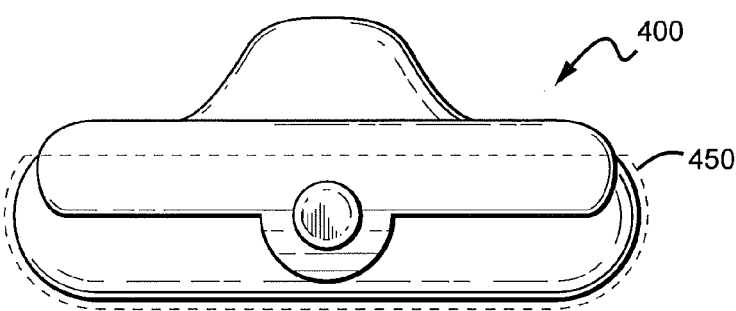
FIG. 4 illustrates an exemplary vibratory scrubbing device with removable skin.

FIG. 4 illustrates an exemplary vibratory scrubbing device 400 with removable skin 450. The removable skin may provide different retention surfaces between the vibratory scrubbing device and the coupled scrubber assembly. The removable skin may also permit different configurations of scrubber assemblies by providing variable projections or retention features. The removable skin 450 may generally or partially conform to surface of the vibratory scrubbing device. For example, the removable skin 450 may be a partial toroid shape such that it fits over a bottom portions of the described vibratory scrubbing device. Alternatively, the removable skin may conform to an exterior surface of the device such that it may cover or otherwise traverse the interior space of the vibratory scrubbing device. The removable skin, may be used in place of the attached scrubber assembly to provide interchangeable cleaning surfaces. The removable skin may also be used in place of the handle, thus providing different gripping surfaces on the top portions of the vibratory scrubbing device. This example, may provide an enclosed top to the body portion, thus permitting a surface of the vibratory scrubbing device to provide pressure to the scrubber assembly onto the surface to be cleaned. The removable skin also be used similar to a sleeve over a ring to retain the scrubber assembly to the vibratory device.

Figure 5:
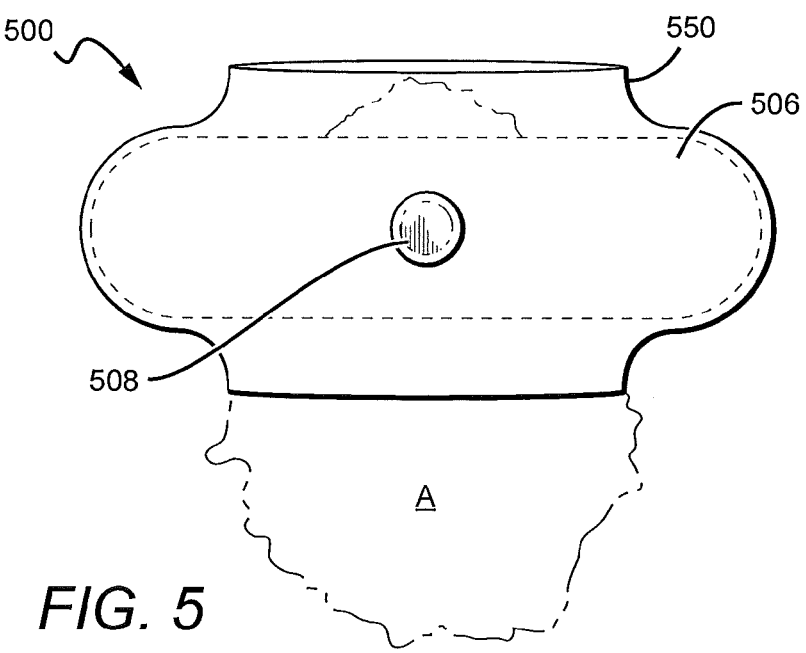
FIG. 5 illustrates an exemplary embodiment of a vibratory scrubber device using a body and sleeve.

FIG. 5 illustrates an exemplary embodiment of a vibratory scrubber device 500 using a body 506 and sleeve 550. The body 506 may be any body shape to circumscribe a scrubber assembly device, such as those previously discussed including 106a and 106b, or 306a, 306b, 306c, and 306d. The body 506 may include a handle or may simple encircle the scrubber assembly. A sleeve 550 is positioned around the body 506 and generally constricts to conform at least partially to an exterior surface of the body. The sleeve 506 may be an elastic material that retains the scrubber assembly within the body 506. The body 506 then contains the motor and associated electronics, including power or setting controls 508 to vibrate the coupled scrubber assembly.

Various examples are provided for the body of the vibratory scrubbing devices. These bodies may be composed of one or more sections that are either removably attachable or integrated. The body sections may be configured to circumscribe a portion of the scrubber assembly and either elastically fit, sectionally attach around the scrubber assembly, or a combination of both. The different sections may be hinged or separable, or otherwise coupled to permit the scrubber assembly to be inserted. The body portion may be configured to accommodate different sized scrubber assemblies by permitting the body portions to contact at various positions, thus creating a variable interior space to accommodate the scrubber assembly. For example, a variable position connection, ratcheted connection, elastic portion, sleeve, etc., may be used to create a variable interior space to insert various scrubber assemblies of different configuration, composition, design, orientation, etc.

The vibratory scrubbing devices as described herein are generally described in terms of body portions, handles, cleaning fluid reservoir, and/or sleeves or skins. These features may be combined, recombined, removed, added, etc. and are not limited to the embodiments as described. For example, the handle may be removed or reconfigured to accommodate the user's application. The location of the handles, reservoir, vibratory motor and associated electronics, and body portions may be moved and reconfigured. For example, a reservoir of cleaning fluid may be incorporated into the handle, body portion, sleeve, retaining feature, or other feature coupled to any of these, or a combination thereof. Similarly, the vibration motor and associated electronics may be housed within the handle or body portion or a combination thereof. These features may be duplicated such that one or more reservoirs or motors may be used. Separate reservoirs may be used to dispense different cleaning fluids, or multiple motors may be used to provide variable speed combinations or vibratory actions for the device.

The vibratory scrubbing device as described herein coupled or attaches to a scrubber assembly. A scrubber assembly is used to generally refer to a cleaning device. The scrubber assembly is not limited in shape, form, configuration, material, orientation, or purpose. As generally shown, the scrubber assembly is an amorphous cleaning device such as a sponge, scrubbie, or loufa. The vibratory scrubbing device encircles or circumscribes the cleaning device to provide a vibratory action to the cleaning process. The vibratory scrubbing device may accommodate different shaped, configurations, and orientations of cleaning devices through use of projections into an interior space, variable coupling settings to create variable interior space configurations or sizes, clamp or ratcheted coupling to increase/decrease an interior space, elastic or stretchable retention features, etc. as generally described herein. The scrubber assembly may use different cleaning features such as bristles, brushes, teeth, sponge, abrasive, porous, etc interfaces to clean a surface. The vibratory scrubbing device may couple to any portion of the scrubber assembly such as the cleaning interface or a handle or other body portion.

Although embodiments of this invention have been fully described with reference to the accompanying drawings, it is to be noted that various changes and modifications will become apparent to those skilled in the art. Such changes and modifications are to be understood as being included within the scope of embodiments of this invention as defined by the appended claims.

The invention claimed is:

1. An apparatus for cleaning an object, the apparatus comprising:
    a vibratory portion including a handle portion, the handle portion including a first projecting surface and a second projecting surface;
    a scrubber assembly whereby the vibratory portion is removably attachable to the scrubber assembly; and
    a motor housed within the vibratory portion, the motor to drive the vibratory portion, wherein the vibratory portion includes a first body portion having a female portion and a second body portion having a male portion releasably attached to one another while in use placing the vibratory portion in an attached state, and the second projecting surface projecting in a direction toward the first projecting surface when the vibratory portion is in the attached state.

2. An apparatus for cleaning an object, the apparatus comprising:
   a vibratory portion including a handle portion, a first body portion and a second body portion, the first body portion and the second body portion hinged together and adjustable between a closed state and an open state;
   a scrubber assembly removably attachable to the vibratory portion; and
   a motor to drive the vibratory portion, wherein the scrubber assembly is disposed through the vibratory portion and a subsection of the scrubber assembly is circumferentially surrounded by the vibratory portion when the vibratory portion is in a closed state.

\* \* \* \* \*